No. 656,667. Patented Aug. 28, 1900.
W. SCHMID.
FLEXIBLE METAL PIPE COUPLING.
(Application filed Nov. 27, 1899.)
(No Model.) 2 Sheets—Sheet 1.
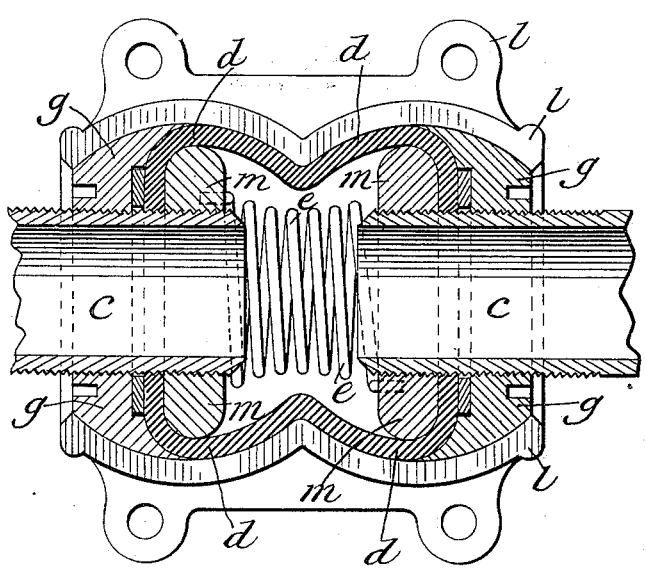
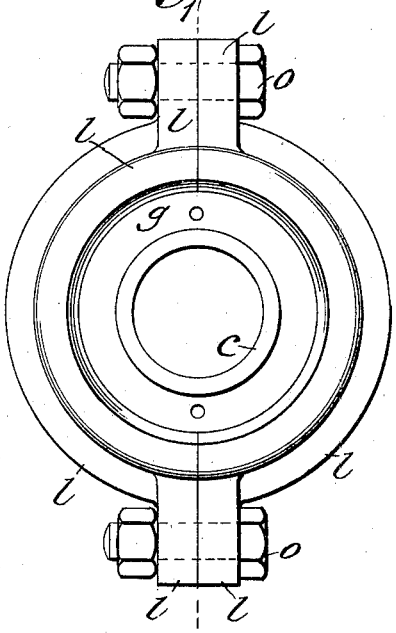
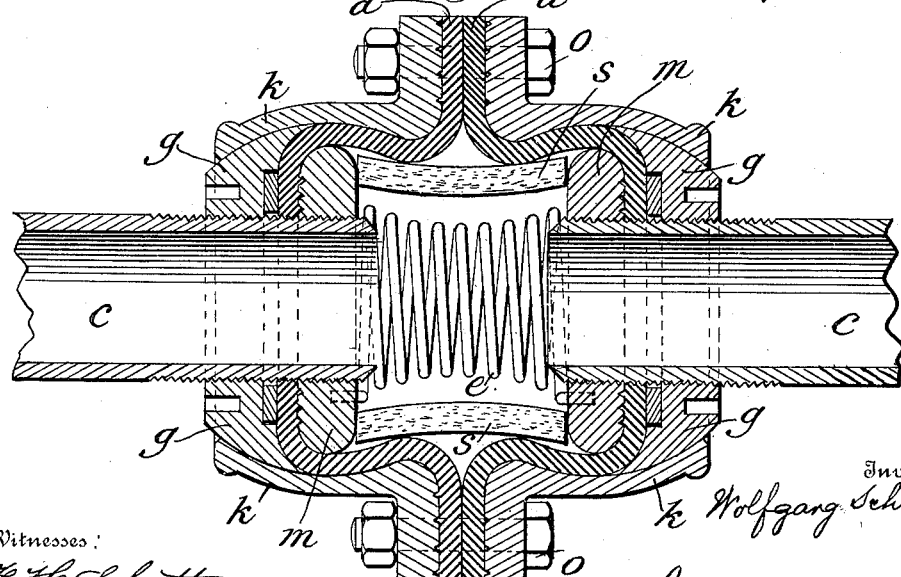
Witnesses:
F. H. Schott
Anton A. Gloetzner
Inventor,
Wolfgang Schmid
By Max Hingü
Attorney.
THE NORRIS PETERS CO., PHOTO-LITHO., WASHINGTON, D. C.

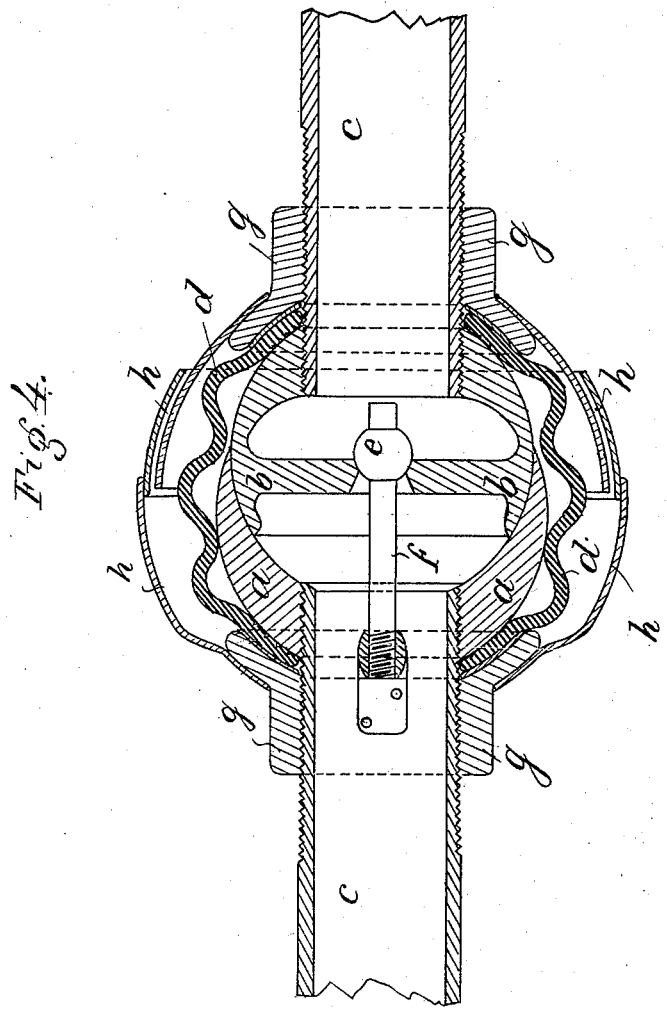

UNITED STATES PATENT OFFICE.

WOLFGANG SCHMID, OF MUNICH, GERMANY.

FLEXIBLE METAL PIPE-COUPLING.

SPECIFICATION forming part of Letters Patent No. 656,667, dated August 28, 1900.

Application filed November 27, 1899. Serial No. 738,488. (No model.)

*To all whom it may concern:*

Be it known that I, WOLFGANG SCHMID, engineer, a citizen of Germany, residing at Grasserstrasse 7/II, Munich, Bavaria, Germany, have invented a certain new and useful Improvement in Pipe-Couplings; and I do hereby declare the following to be a full, clear, and exact description of the invention, such as will enable others skilled in the art to which it appertains to make and use the same.

This invention relates to pipe-couplings in which the fluid-tight closing of the joint is effected by means of a flexible elastic pipe-section.

The object of my invention is to provide an improved means for securing this elastic pipe-section or membrane in proper position and also to provide means for inclosing the membrane in order to protect it and to prevent undue wear and stretching.

My invention consists, broadly, in forming flanges on the ends of the pipes to be coupled and in having nuts screwing on each of the pipes up to these flanges in order to bind the ends of the flexible pipe-section securely between each flange and its nut, and, further, to provide a suitable casing to surround the flexible coupling, and in such other features of construction and arrangement, separately or in combination, as will be hereinafter described, and pointed out in the claims.

In the accompanying drawings, Figure 1 shows in longitudinal section a coupling embodying my invention in my preferred form of construction and arrangement. Fig. 2 is an end view of the same. Fig. 3 shows a coupling similar to that shown in Fig. 1, but having a different form of protecting-casing. Fig. 4 shows a modification.

In the several views $c\ c$ represent two pipes whose extremities are to be coupled. These pipes are screw-threaded, as shown, and have flanges or nuts $m\ m$, which are permanently secured to the pipes at their extremities by soldering or otherwise. These nuts are preferably made with rounded edges. On each of the pipes is a nut $g$, having its side toward the end of the pipe made concave and its edge curved, as shown in Figs. 1 and 3. A flexible pipe-section, preferably made of rubber fabric or other elastic material, has each end secured between the flange $m$ and the nut $g$. A sectional metal casing $l$, bisected longitudinally and shaped as shown in Figs 1 and 2, surrounds and tightly incloses the parts just described, the sections being secured together by bolts, as shown in Fig. 2. A spiral spring $e$ is interposed between the extremities of the pipe members to force them apart and retain them in the proper position, which spring has its extremities resting in holes in the flanges $m$.

In the modification shown in Fig. 3 the external casing is bisected transversely and the flexible elastic pipe-section is also bisected and has one pair of its extremities $d\ d'$ secured between the sections $k\ k$ of the casing by bolts, as shown. A tubular section of asbestos $s$ is preferably inserted to line the flexible elastic pipe-section in order to protect it to a large extent from the destructive action of the steam when the coupling is used to connect steam-pipes.

In the modification shown in Fig. 4 the extremities $a\ b$ on the end of the pipes $c$ constitute a ball-and-socket joint, being secured together by means of a rod $f$, secured to the pipe $c$, which rod has a ball on its extremity that rotates in an aperture in a cross-bar attached inside of the part $b$. In this modification the elastic pipe-section $d$ is secured by nuts $g$, as in the other forms described above. A suitable metal casing $h$ surrounds this joint, as shown in the drawings.

Having described my invention, I claim the following:

1. The combination in a pipe-coupling, of a pair of pipes having flanges on their extremities, said pipes having external threads in proximity to said flanges, a nut on each pipe engaging said threads, a flexible pipe-section having each end attached to one of said pipes and secured between said flange and said nut, and a sectional casing engaging said pipe members.

2. The combination in a pipe-coupling, of a pair of pipes having flanges on their extremities, said pipes having external threads in proximity to the flanges, a nut on each pipe engaging said threads, a flexible pipe-section having each end attached to one of said pipes and secured between said flange and said nut, and a transversely-bisected casing engaging said pipe members.

3. The combination in a pipe-coupling, of a pair of pipes having flanges on their extremities, said pipes having external threads in proximity to their flanges, a nut on each pipe engaging said threads, a flexible pipe-section having each end attached to one of said pipes and secured between said flange and said nut, a sectional casing engaging said pipe members, and means connected with each pipe member tending to force them apart.

4. The combination in a pipe-coupling, of a pair of pipes having flanges on their extremities, said pipes having external threads in proximity to their flanges, a nut on each pipe engaging said threads, said nuts having concave faces on the sides opposing said flanges, a flexible pipe-section having each end attached to one of said pipes and secured between said flange and said nut, and a sectional casing engaging said pipe members.

5. The combination in a pipe-coupling, of a pair of pipes having flanges on their extremities, said pipes having external threads in proximity to their flanges, a nut on each pipe connecting said threads, said nuts having concave faces on the sides opposing said flanges, said flanges having convex faces on the sides opposing said nuts, a flexible pipe-section having each end attached to one of said pipes and secured between said flange and said nut, and a sectional casing engaging said pipe members.

6. The combination in a pipe-coupling, of a pair of pipes having flanges on their extremities, said pipes having external threads in proximity to their flanges, a nut on each pipe engaging said threads, said nuts having concave faces on the sides opposing said flanges and having convex peripheries, said flanges having convex faces on the sides opposing said nuts, a flexible pipe-section having each end attached to one of said pipes and secured between said flange and said nut, and a sectional casing engaging said pipe members.

7. The combination in a pipe-coupling, of a pair of pipes having flanges on their extremities, said pipes having external threads in proximity to their flanges, a nut on each pipe engaging said threads, said nuts having concave faces on the sides opposing said flanges and having convex peripheries, said flanges having convex faces on the sides opposing said nuts, a flexible pipe-section having each end attached to one of said pipes and secured between said flange and said nut, and a transversely-bisected casing engaging said pipe members by the said convex peripheries of the nuts.

8. The combination in a pipe-coupling, of a pair of pipes having flanges on their extremities, said pipes having external threads in proximity to said flanges, a nut on each pipe engaging said threads, a flexible pipe-section having each end attached to one of said pipes and secured between said flange and said nut, a sectional casing engaging said pipe members, and a pipe-section of non-conducting material lining the exposed inner surface of said flexible pipe-section.

In testimony whereof I affix my signature in presence of two witnesses.

WOLFGANG SCHMID.

Witnesses:
EMIL HENZEL,
CHERESE ETTL.